United States Patent
Liu et al.

(10) Patent No.: US 11,588,601 B2
(45) Date of Patent: *Feb. 21, 2023

(54) SYSTEM AND METHOD FOR CONTROL SIGNALING

(71) Applicant: Futurewei Technologies, Inc., Plano, TX (US)

(72) Inventors: Bin Liu, San Diego, CA (US); Xianda Liu, Beijing (CN); Kunpeng Liu, Beijing (CN); Young Hoon Kwon, Laguna Niguel, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/327,163

(22) Filed: May 21, 2021

(65) Prior Publication Data

US 2021/0288767 A1   Sep. 16, 2021

Related U.S. Application Data

(63) Continuation of application No. 16/015,842, filed on Jun. 22, 2018, now Pat. No. 11,025,388.

(Continued)

(51) Int. Cl.
*H04L 5/00* (2006.01)
*H04B 7/0417* (2017.01)
(Continued)

(52) U.S. Cl.
CPC .......... *H04L 5/005* (2013.01); *H04B 7/0404* (2013.01); *H04B 7/0417* (2013.01);
(Continued)

(58) Field of Classification Search
CPC ..... H04L 5/005; H04B 7/0456; H04B 7/0404; H04B 7/0417; H04W 72/0413; H04W 72/042
See application file for complete search history.

(56) References Cited

U.S. PATENT DOCUMENTS 11,025,388 B2 * 6/2021 Liu ................ H04L 5/0091
2015/0085787 A1   3/2015 Ouchi
(Continued)

FOREIGN PATENT DOCUMENTS

CN   102752070 A   10/2012
CN   103516464 A   1/2014
(Continued)

OTHER PUBLICATIONS

Guangdong Oppo Mobile Telecom, "Further discussion on SRS design for NR", 3GPP TSG RAN WG1 Meeting #90, R1-1713245, Aug. 21-25, 2017, 4 Pages, Prague, Czech.
(Continued)

*Primary Examiner* — Christine Ng
(74) *Attorney, Agent, or Firm* — Slater Matsil, LLP

(57) ABSTRACT

A method for operating an access node includes sending a configuration of one or more first channel state information reference signal (CSI-RS) resources and a configuration of one or more sounding reference signal (SRS) resources, generating first control information including an identifier of a SRS resource set that includes the one or more SRS resources precoded by one or more precoders, generating second control information including an identifier of the one or more first CSI-RS resources, wherein the one or more first CSI-RS resources are associated with the identified SRS resource set, wherein the one or more first CSI-RS resources convey a downlink reference signal (RS) used for making measurements, and wherein the one or more precoders are determined in accordance with measurements of the downlink RS, sending the first control information and the second control information, and sending the downlink RS.

32 Claims, 7 Drawing Sheets

Related U.S. Application Data

(60) Provisional application No. 62/570,418, filed on Oct. 10, 2017, provisional application No. 62/589,945, filed on Nov. 22, 2017.

(51) Int. Cl.
  *H04W 72/04* (2023.01)
  *H04B 7/0404* (2017.01)
  *H04B 7/0456* (2017.01)

(52) U.S. Cl.
  CPC ......... *H04B 7/0456* (2013.01); *H04L 5/0048* (2013.01); *H04L 5/0091* (2013.01); *H04W 72/042* (2013.01); *H04W 72/0413* (2013.01); *H04L 5/0023* (2013.01)

(56) References Cited

U.S. PATENT DOCUMENTS

| | | | |
|---|---|---|---|
| 2016/0165616 | A1 | 6/2016 | Ohwatari et al. |
| 2017/0208568 | A1 | 7/2017 | Nam et al. |
| 2018/0019795 | A1* | 1/2018 | Zhang ............... H04B 7/0456 |
| 2018/0097595 | A1* | 4/2018 | Huang ............... H04L 1/0009 |
| 2018/0241454 | A1* | 8/2018 | Lee ................... H04L 5/0048 |
| 2018/0287757 | A1* | 10/2018 | Onggosanusi ..... H04L 5/0048 |

FOREIGN PATENT DOCUMENTS

| | | |
|---|---|---|
| CN | 106165489 A | 11/2016 |
| CN | 107872896 A | 4/2018 |
| EP | 3223447 A1 | 9/2017 |
| EP | 3313011 A1 | 4/2018 |
| EP | 3337053 A1 | 6/2018 |
| JP | 2013539278 A | 10/2013 |
| KR | 20170019982 A | 2/2017 |
| WO | 2012023007 A1 | 2/2012 |
| WO | 2016204546 A1 | 12/2016 |

OTHER PUBLICATIONS

Huawei et al., "Non-codebook based transmission for UL MIMO", 3GPP TSG RAN WG1 Meeting #90bis, R1-1717296, Oct. 9-13, 2017, 4 Pages, Prague, Czech Republic.

Intel Corporation, "On non-codebook Based UL Transmission", 3GPP TSG RAN WG1 Meeting #90, R1-1712538, August 21- 25, 2017, 5 Pages, Prague, P.R. Czechia.

Vivo, "Discussion on Non-codebook Based UL Transmission", 3GPP TSG RAN WG1 Meeting #90bis, R1-1717468, Oct. 9-13, 2017, 4 Pages, Prague, CZ.

"RAN1 Chairman's Notes," 3GPP TSG RAN WG1 Meeting #90, Prague, Czech Replublic, Aug. 21-25, 2017, 143 pages.

Nokia et al., "SRS transmission for beam management", 3GPP TSG RAN WG1 Meeting #90, R1-1714250, Aug. 21-25, 2017, 6 Pages, Prague, Czech Republic.

Huawei et al., "Discussion on reciprocity based CSI acquisition mechanism", 3GPP TSG RAN WG1 Meeting #88bis, R1-1706192, Apr. 3-7, 2017, 7 Pages, Spokane, USA.

Catt, "Discussion on non-codebook based transmission for UL", 3GPP TSG RAN WG1 Meeting NR#3, R1-1715795, Sep. 18-21, 2017, 4 Pages, Nagoya, Japan.

\* cited by examiner

SYSTEM AND METHOD FOR CONTROL SIGNALING

This application is a continuation of U.S. patent application Ser. No. 16/015,842, filed on Jun. 22, 2018, now U.S. Pat. No. 11,025,388 issued on Jun. 1, 2021, entitled "System and Method for Control Signaling", which claims the benefit of U.S. Provisional Application No. 62/570,418, filed on Oct. 10, 2017, entitled "System and Method for Indicating Control Signaling," and to U.S. Provisional Application No. 62/589,945, filed on Nov. 22, 2017, entitled "System and Method for Indicating Control Signaling," both of which applications are hereby incorporated herein by reference in their entireties.

TECHNICAL FIELD

The present disclosure relates generally to a system and method for digital communications, and, in particular embodiments, to a system and method for control signaling.

BACKGROUND

Modern communications systems, especially those with high path loss (such as those operating at millimeter wavelength frequencies and above), use beamforming to improve communications system performance. Beamformed communications use precoding to shape transmit or receive beams to increase signal gain. However, beamformed communications may increase the complexity of communications by requiring additional communications overhead to determine which precoders to use at the transmitting device or the receiving device to maximize performance.

SUMMARY

Example embodiments provide a system and method for control signaling.

In accordance with an example embodiment, a computer-implemented method for operating an access node is provided. The method includes sending, by the access node to a user equipment (UE), a configuration of one or more first channel state information reference signal (CSI-RS) resources and a configuration of one or more sounding reference signal (SRS) resources, generating, by the access node, first control information including an identifier of a SRS resource set that includes the one or more SRS resources precoded by one or more precoders, generating, by the access node, second control information including an identifier of the one or more first CSI-RS resources, wherein the one or more first CSI-RS resources are associated with the identified SRS resource set, wherein the one or more first CSI-RS resources convey a downlink reference signal (RS) used for making measurements, and wherein the one or more precoders are determined in accordance with measurements of the downlink RS, sending, by the access node, the first control information and the second control information, and sending, by the access node, the downlink RS.

Optionally, in any of the preceding embodiments, an embodiment wherein the one or more precoders used to precode the one or more SRS resources are derived in accordance with at least one of the one or more first CSI-RS resources.

Optionally, in any of the preceding embodiments, an embodiment wherein when the second control information identifies a plurality of first CSI-RS resources including a second CSI-RS resource, the method further includes generating, by the access node, third control information including an identifier of the second CSI-RS resource, sending, by the access node, the third control information, wherein the third control information is sent in a media access control control element (MAC CE) or a downlink control information (DCI) message, and sending, by the access node, the CSI-RS in the second CSI-RS resource.

Optionally, in any of the preceding embodiments, an embodiment wherein the method further includes sending, by the access node, one or more reporting settings, wherein at least one first report setting of the one or more reporting settings includes a channel state information (CSI) report configuration, and wherein the first control information is included in at least one second report setting of the one or more reporting settings, and sending, by the access node, a CSI request field, wherein at least one state of the CSI request field includes an identifier of the at least one second reporting setting including the first control information, and wherein the CSI request field is sent in a DCI message.

Optionally, in any of the preceding embodiments, an embodiment wherein when the second control information identifies a plurality of CSI-RS resources including a second CSI-RS resource and at least one state of the CSI request field includes the identifier of the at least one second reporting setting including the first control information, wherein the third control information is included in the CSI request field, and wherein the at least one state of the CSI request field also includes the identifier of the second CSI-RS resource.

Optionally, in any of the preceding embodiments, an embodiment wherein the state of a CSI request field that includes the identifier of the second CSI-RS resource also includes information conveying that no report is triggered.

Optionally, in any of the preceding embodiments, an embodiment wherein the downlink RS is sent in a network resource used to send the CSI request field or in a first number of network resources after the network resource used to send the CSI request field, and wherein the method further includes receiving, by the access node, at least one SRS resource in a second number of network resources after the network resource used to send the downlink RS.

Optionally, in any of the preceding embodiments, an embodiment wherein the first control information is included in a SRS request field, and wherein at least one state of the SRS request field includes the identifier of the SRS resource set.

Optionally, in any of the preceding embodiments, an embodiment wherein when the second control information identifies a plurality of first CSI-RS resources including a second CSI-RS resource and the at least one state of the SRS request field includes the first control information, wherein the third control information is included in the SRS request field, and wherein the at least one state of the SRS request field also includes the identifier of the second CSI-RS resource.

Optionally, in any of the preceding embodiments, an embodiment wherein the CSI-RS is sent in a network resource used to send the SRS request field or in a first number of network resources after the network resource used to send the SRS request field, and wherein the method further comprises receiving, by the access node, at least one SRS resource in a second number of network resources after the network resource used to send the CSI-RS, wherein the network resource is one of a slot, a subframe, or an orthogonal frequency division multiplexing (OFDM) symbol.

Optionally, in any of the preceding embodiments, an embodiment wherein the second control information further includes the identifier of the SRS resource set, and at least one index of the at least one state of the SRS request field.

Optionally, in any of the preceding embodiments, an embodiment wherein the second CSI-RS resource is not associated with a reporting setting including a CSI report configuration.

Optionally, in any of the preceding embodiments, an embodiment wherein the second CSI-RS resource is associated with a reporting setting and the CSI reporting setting is configured with a reporting content value set to no report.

In accordance with an example embodiment, a computer implemented method for operating a UE is provided. The method includes receiving, by the UE, a configuration of one or more first CSI-RS resources and a configuration of one or more SRS resources, receiving, by the UE, a first control information including an identifier of a SRS resource set that includes one or more SRS resources, receiving, by the UE, a second control information including an identifier of one or more first CSI-RS resources, wherein the one or more first CSI-RS resources are associated with the identified SRS resource set, determining, by the UE, one or more precoders for transmitting SRSs in the one or more SRS resources in accordance with measurements of a downlink RS that is received in one of the one or more CSI-RS resources, and sending, by the UE, the SRSs using the one or more precoders in the one or more SRS resources.

Optionally, in any of the preceding embodiments, an embodiment wherein when the second control information identifies a plurality of first CSI-RS resources including a second CSI-RS resource, wherein the method further includes receiving, by the UE, a third control information including an identifier of the second CSI-RS resource, wherein the third control information is sent in a MAC CE or a DCI message, receiving, by the UE, the CSI-RS in the second CSI-RS resource, and determining, by the UE, the precoder used for transmitting SRSs in the one or more SRS resources by measuring the CSI-RS in the second CSI-RS resource.

Optionally, in any of the preceding embodiments, an embodiment wherein the method further includes receiving, by the UE, one or more reporting settings, wherein at least one first report setting of the one or more reporting settings includes a CSI report configuration, and wherein the first control information is included in at least one second report setting of the one or more reporting settings, and receiving, by the UE, a CSI request field, wherein at least one state of the CSI request field includes an identifier of the at least one second reporting setting including the first control information, and wherein the CSI request field sent in a DCI message.

Optionally, in any of the preceding embodiments, an embodiment wherein the first control information is included in a SRS request field, and wherein at least one state of the SRS request field includes the identifier of the SRS resource set.

Optionally, in any of the preceding embodiments, an embodiment wherein when the second control information identifies a plurality of first CSI-RS resources including a second CSI-RS resource and the at least one state of the SRS request field includes the first control information, wherein the third control information is included in a SRS request field, and wherein the at least one state of the SRS request field also includes the identifier of the second CSI-RS resource.

Optionally, in any of the preceding embodiments, an embodiment wherein the CSI-RS is received in one of a network resource used to receive the SRS request field or in a first number of network resources after the network resource used to receive the SRS request field, and wherein the method further comprises sending, by the UE, at least one SRS resource in a second number of network resources after the network resource used to receive the CSI-RS, wherein the network resource is one of a slot, a subframe, or an OFDM symbol.

In accordance with an example embodiment, an access node is provided. The access node includes a non-transitory memory storage comprising instructions, and one or more processors in communication with the memory storage. The one or more processors execute the instructions to send, to a UE, a configuration of one or more first CSI-RS resources and a configuration of one or more SRS resources, generate a first control information including an identifier of a SRS resource set that includes the one or more SRS resources precoded by one or more precoders, generate a second control information including an identifier of one or more first CSI-RS resources, wherein the one or more first CSI-RS resources are associated with the identified SRS resource set, wherein the one or more first CSI-RS resources convey a downlink reference signal (RS) used for making measurements, and wherein the one or more precoders are determined in accordance with measurements of the downlink RS, send the first control information and the second control information, and send the downlink RS.

Optionally, in any of the preceding embodiments, an embodiment wherein when the second control information identifies a plurality of first CSI-RS resources including a second CSI-RS resource, the one or more processors further execute instructions to generate a third control information including an identifier of the second CSI-RS resource, send the third control information, wherein the third control information is sent in a MAC CE or a DCI message, and send the CSI-RS in the second CSI-RS resource.

Optionally, in any of the preceding embodiments, an embodiment wherein the one or more processors further execute instructions to send one or more reporting settings, wherein at least one first report setting of the one or more reporting settings includes a CSI report configuration, and wherein the first control information is included in at least one second report setting of the one or more reporting settings, and send a CSI request field, wherein at least one state of the CSI request field includes an identifier of the at least one second reporting setting including the first control information, and wherein the CSI request field is sent in a DCI message.

Optionally, in any of the preceding embodiments, an embodiment wherein the first control information is included in a SRS request field, wherein at least one state of the SRS request field includes the identifier of the SRS resource set, wherein when the second control information identifies a plurality of first CSI-RS resources including a second CSI-RS resource and at least one state of the SRS request field includes the first control information, wherein the third control information is included in a SRS request field, and wherein the at least one state of the SRS request field also includes the identifier of the second CSI-RS resource.

In accordance with an example embodiment, a UE is provided. The UE includes a non-transitory memory storage comprising instructions, and one or more processors in communication with the memory storage. The one or more processors execute the instructions to receive a configuration of one or more first CSI-RS resources and a configuration of one or more SRS resources, receive a first control information including an identifier of a SRS resource set that includes one or more SRS resources, receive a second control information including an identifier of one or more first CSI-RS resources, wherein the one or more first CSI-RS resources are associated with the identified SRS resource set, determine one or more precoders for transmitting SRSs in the one or more SRS resources in accordance with measurements of a downlink RS that is received in one of the one or more CSI-RS resources, and send the SRSs using the one or more precoders in the one or more SRS resources.

Optionally, in any of the preceding embodiments, an embodiment wherein when the second control information identifies a plurality of CSI-RS resources including a second CSI-RS resource, the one or more processors further execute instructions to receive a third control information including an identifier of the second CSI-RS resource, wherein the third control information is sent in a MAC CE or a DCI message, receive the CSI-RS in the second CSI-RS resource, and determine the precoder used for transmitting SRSs in the one or more SRS resources by measuring the CSI-RS in the second CSI-RS resource.

Optionally, in any of the preceding embodiments, an embodiment wherein the one or more processors further execute instructions to receive one or more reporting settings, wherein at least one first report setting of the one or more reporting settings includes a CSI report configuration, and wherein the first control information is included in at least one second report setting of the one or more reporting settings, and receive a CSI request field, wherein at least one state of the CSI request field includes an identifier of the at least one second reporting setting including the first control information, and wherein the CSI request field sent in a DCI message.

Optionally, in any of the preceding embodiments, an embodiment wherein the first control information is included in a SRS request field, wherein at least one state of the SRS request field includes the identifier of the SRS resource set, wherein when the second control information identifies a plurality of first CSI-RS resources including a second CSI-RS resource and the at least one state of the SRS request field includes the first control information, wherein the third control information is included in a SRS request field, and wherein the at least one state of the SRS request field also includes the identifier of the second CSI-RS resource.

Optionally, in any of the preceding embodiments, an embodiment wherein the CSI-RS is received in one of a network resource used to receive the SRS request field or in a first number of network resources after the network resource used to receive the SRS request field, and wherein the method further comprises sending, by the UE, at least one SRS resource in a second number of network resources after the network resource used to receive the CSI-RS, wherein the network resource is one of a slot, a subframe, or an OFDM symbol.

Practice of the foregoing embodiments enables devices to send or receive control signaling to facilitate non-codebook based beamformed transmission.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
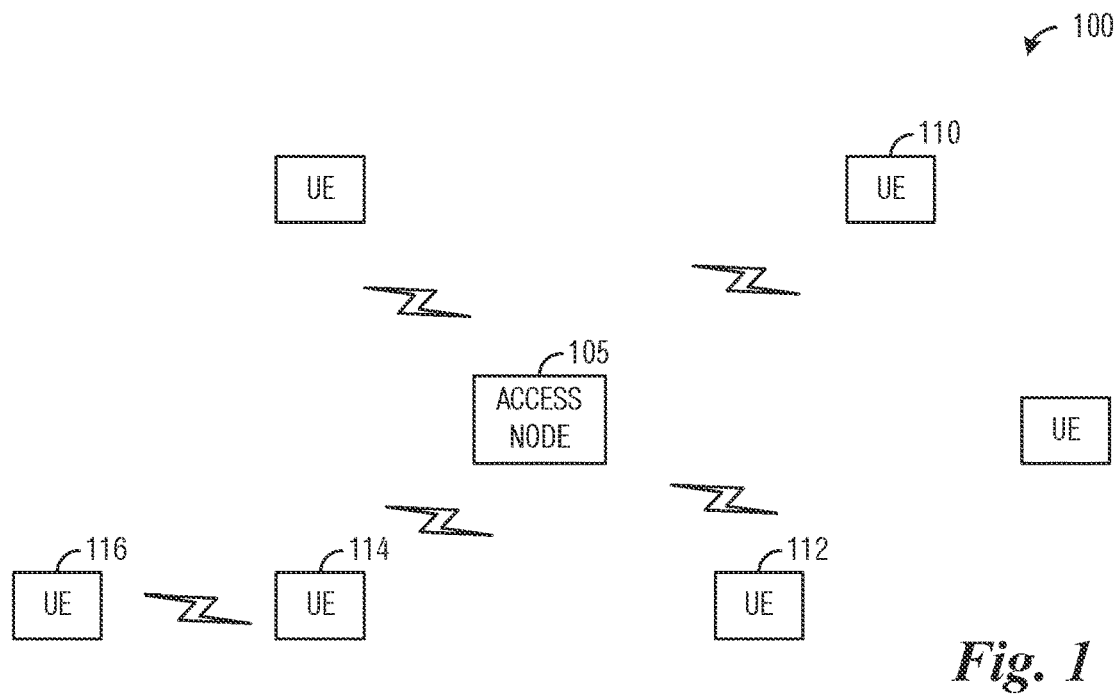
FIG. 1 illustrates an example wireless communications system.

FIG. 1 illustrates an example wireless communications system 100. Communications system 100 includes an access node 105 serving a plurality of UEs, including UEs 110, 112, 114, and 116. In a first communications mode, transmissions originating from or destined for a UE that is served by access node 105, pass through access node 105. In a second communications mode, UEs can communicate directly with one another without having access node 105 serving as an intermediary. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.11a/b/g/n/ac, etc. While it is understood that communications systems may employ multiple eNBs capable of communicating with a number of UEs, only one eNB, and a number of UEs are illustrated for simplicity.

Figure 2A:
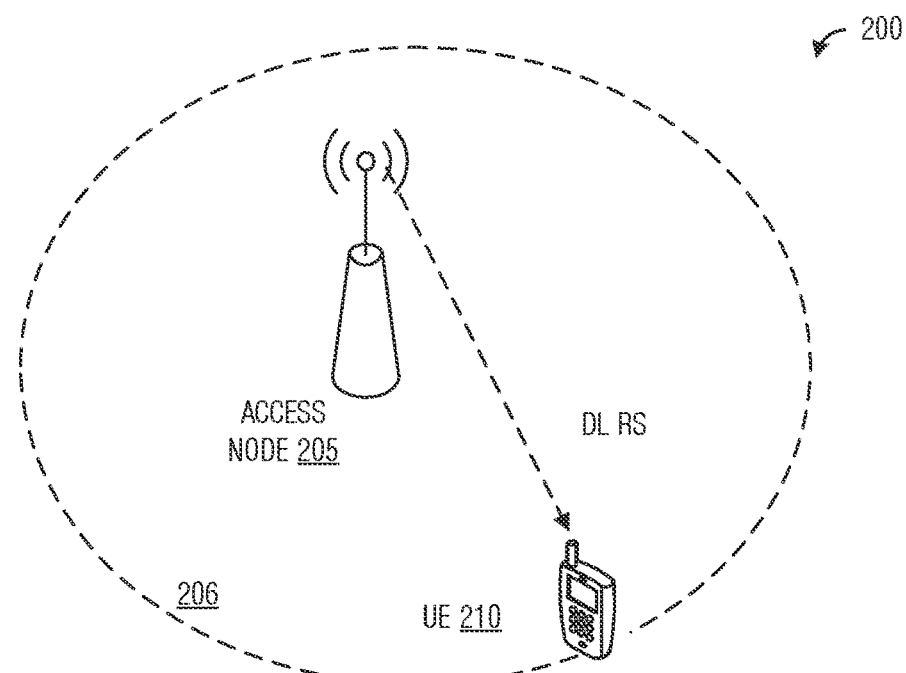
FIGS. 2A-2C illustrate high level views of non-codebook based transmission in a communications system.
Figure 2B:
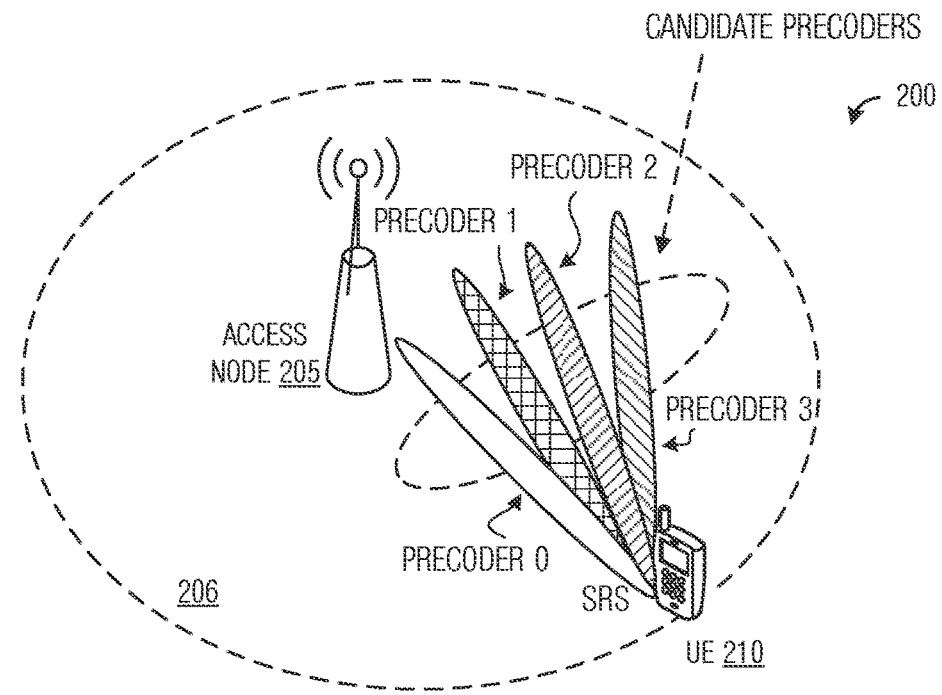
Figure 2C:
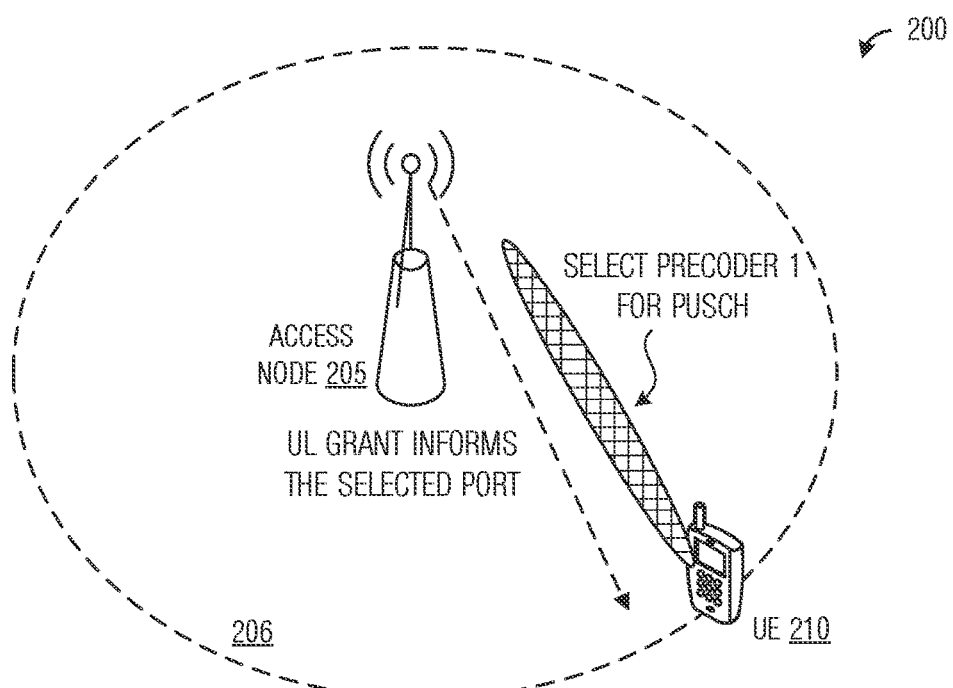

FIGS. 2A-2C illustrate high level views of non-codebook based transmission in a communications system 200. As shown in FIG. 2A, communications system 200 includes an access node 205 (with coverage area 206) sends downlink reference signals (RSs) to permit a UE 210 to make measurements, such as channel measurements. UE 210 derives candidate precoders of communications beams in accordance with the measurements. UE 210 may also make use of channel reciprocity to determine channel measurements or derive candidate precoders. As shown in FIG. 2B, UE 210 transmits sounding reference signals (SRSs) precoded using the candidate precoders, resulting in a plurality of precoded SRSs (denoted precoders 0 through 3, but different numbers of SRS precoders are possible). The precoded SRSs are transmitted on configured SRS resources, for example, which may be specified by access node 205. Access node 205 makes measurements of the configured SRS resources and selects one or more precoders. As an example, the one or more precoders selected meet a criterion, such as a signal strength criterion or a signal quality criterion (including signal plus interference to noise ratio (SINR), signal to noise ratio (SNR), reference signal received power (RSRP), reference signal received quality (RSRQ), received signal power, and so on). As shown in FIG. 2C, access node 205 sends information about of the one or more selected precoders to UE 210. The information about the one or more selected precoders may be sent in an uplink (UL) grant, for example. UE 210 uses the one or more selected precoders (as informed by the access node) to beamform transmissions on a physical uplink shared channel (PUSCH) transmission. Resources for the PUSCH transmission may have been specified in the uplink grant, for example.

With respect to determining precoders for PUSCH transmission in a non-codebook based uplink multiple input multiple output (MIMO) environment, it has been agreed that information related to downlink measurement RS transmissions is to be provided to a UE for the purpose of supporting measurements made by the UE and candidate precoder determination. An example of the downlink measurement RS may be a channel state information RS (CSI-RS), but other RSs may be used. However, there remains a need to provide information to the UE about the CSI-RS to support non-codebook based uplink transmission.

According to an example embodiment, the configuration of one or more channel state information reference signal (CSI-RS) resources is provided to a UE to enable the UE to receive the CSI-RS and to derive downlink channel estimation. The configuration of the CSI-RS resource includes an identifier, time domain behavior, number of ports, frequency domain density, and so on, or information thereof. As an example, an identifier of one or more CSI-RS resources may be information that permits the UE to locate the one or more CSI-RS resource out of a plurality of time-frequency resources, including a time slot number(s), a frequency band or tone number(s), a resource element number(s), a component carrier number(s), and so forth. The configuration of one or more sounding reference signal (SRS) resources is provided to a UE to enable the UE to transmit the SRS within the SRS resources. The configuration of the SRS resource includes an identifier, time domain behavior, number of ports, number of OFDM symbols, SRS bandwidth and frequency hopping bandwidth, and so on, or information thereof. As an example, an identifier of one or more SRS resources may be information that permits the UE to locate the one or more SRS resources out of a plurality of time-frequency resources, including a time slot number(s), a frequency band or tone number(s), a resource element number(s), a component carrier number(s), and so forth. Control information related to one or more downlink measurement RSs and one or more SRS resources is also provided to a UE to enable the UE to determine candidate precoders that are used to transmit SRS in the one or more SRS resource. The control information informs the UE which downlink measurement RS (e.g., a CSI-RS) to measure to determine candidate precoders for transmitting the SRS. The control information informs the UE which SRS resource to use to transmit the precoded SRS (which are the SRS precoded by the candidate precoders, for example). Each of the one or more SRS resources has one antenna port, such as a virtual antenna port or logical antenna port. The UE may report its capability of maximum number of SRS resources that can be transmitted simultaneously. The access node may configure the number of SRS resource according to the UE capability reporting. The number of the configured SRS resources may be the maximum number of transmission layers of PUSCH, for example.

Figure 3:
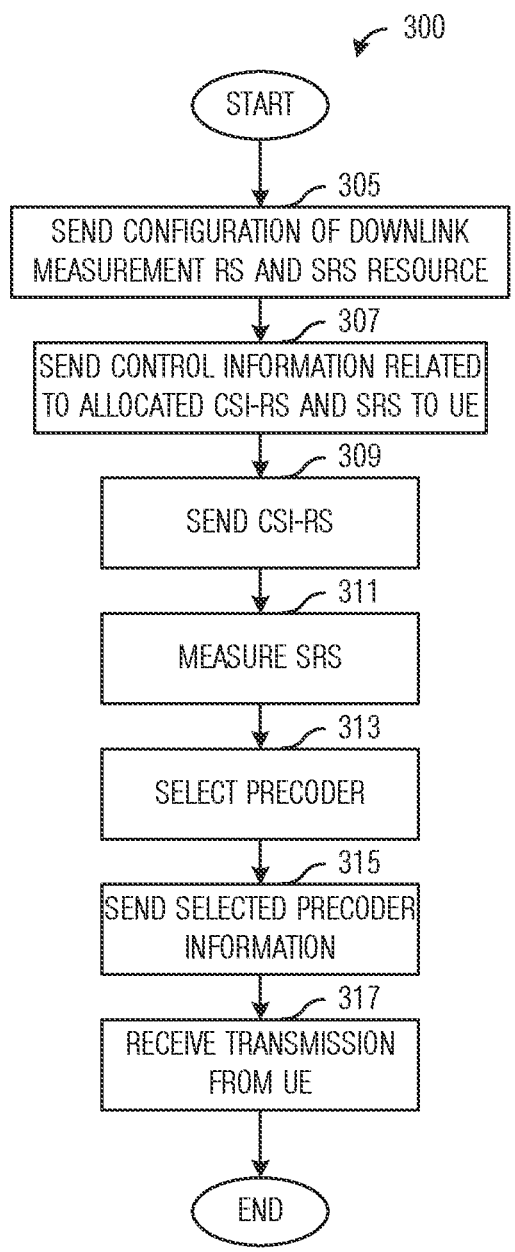
FIG. 3 illustrates a flow diagram of example operations occurring in an access node participating in an uplink transmission from a UE according to example embodiments described herein.

FIG. 3 illustrates a flow diagram of example operations 300 occurring in an access node participating in an uplink transmission from a UE. Operations 300 may be indicative of operations occurring in an access node as the access node participates in an uplink transmission from a UE.

Operations 300 begin with the access node configuring one or more downlink measurement RSs (such as CSI-RSs) and one or more SRS resources and sending the configuration (block 305). The access node sends control information related to one or more downlink measurement RSs (such as a CSI-RS) and one or more SRS resources to the UE (block 307). The control information related to the one or more downlink measurement RSs and the one or more SRS resources may be sent together or separately. The control information may be sent in a media access control (MAC) control element (CE) message or radio resource control (RRC) message, or a combination of both MAC CE and RRC messages. The control information may be further sent in a downlink control information (DCI) message. The control information may convey information about the configuration of the one or more downlink measurement RSs (which may include information about one or more downlink measurement RS resources and the downlink measurement RS, for example) and one or more SRS resources to inform the UE how to receive the downlink measurement RS and transmit the SRS, the configuration at least includes the frequency and time domain location of one or more downlink measurement RS resources and one or more SRS resources. A detailed discussion of the control information and how it is sent to the UE is provided below.

The access node sends the downlink measurement RS (block 309). The downlink measurement RS may be a CSI-RS, for example, but other signals may be used. The downlink measurement RS may be sent in a downlink measurement RS resource, such as a CSI-RS resource. The access node measures a SRS received from the UE (block 311). The access node makes channel measurements, such as SINR, SNR, RSRP, RSRQ, received signal power, and so on, based on the SRS transmitted by the UE. The SRS may be precoded with one or more candidate precoders and the access node makes channel measurements of the one or more precoded SRSs which are transmitted in the one or more SRS resources. The access node selects one or more precoders based on the channel measurements when more than one SRS resources are configured (block 313). As an example, the access node selects the precoder associated with a highest channel measurement. If there are more than one channel measurements that are the same (or substantially the same), or if a higher spatial multiplexing PUSCH transmission is scheduled, the access node selects more than one precoders, with each of the more than one precoders potentially being used for one layer of the higher spatial multiplexing PUSCH transmission. The access node sends information about the one or more selected precoders from the more than one SRS resources by SRS resource indication (SRI) field (block 315). As an example, the access node sends an identifier of each of the one or more selected precoders or the identifier of the SRS resources related to the one or more selected precoders. As an example, an identifier of the one or more selected precoders may be information that permits the UE to determine the one or more selected precoders selected by the access node, including a beam index(es) associated with the higher channel measurement. The access node receives a PUSCH transmission from the UE (block 317). The PUSCH transmission may be precoded using the one or more selected precoders.

Figure 4:
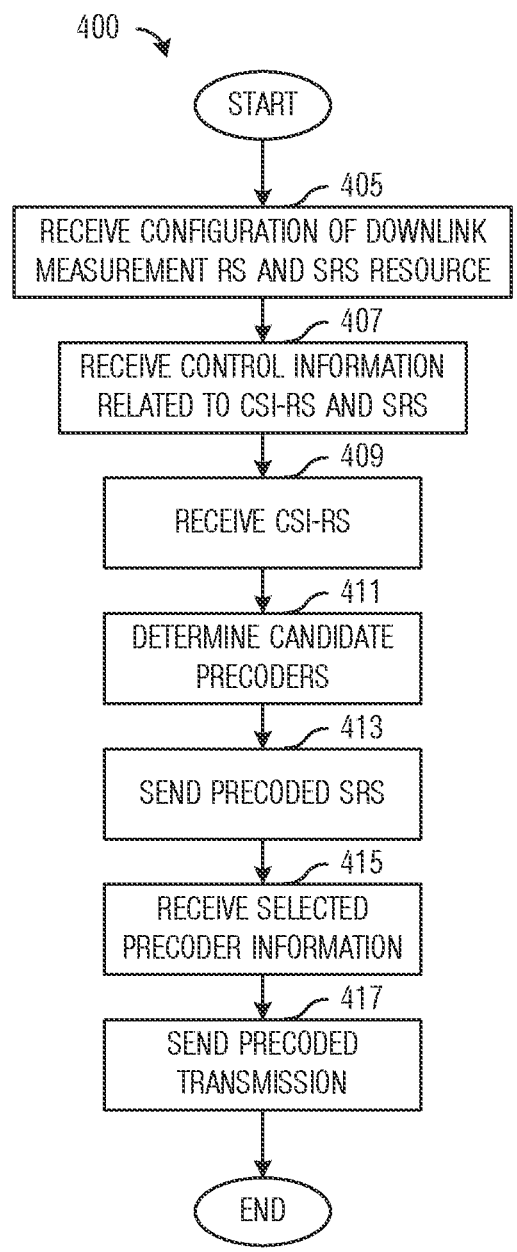
FIG. 4 illustrates a flow diagram of example operations occurring in a UE participating in an uplink transmission to an access node according to example embodiments described herein.

FIG. 4 illustrates a flow diagram of example operations 400 occurring in a UE participating in an uplink transmission to an access node. Operations 400 may be indicative of operations occurring in a UE as the UE participates in an uplink transmission to an access node.

Operations 400 begin with the UE receiving configuration information about one or more downlink measurement RSs (such as CSI-RSs) and one or more SRS resources (block 405). The UE receives control information related to one or more downlink measurement RSs (such as a CSI-RS) and one or more SRS resources from the access node (block 407). The control information related to the one or more downlink measurement RSs (which may include information about one or more downlink measurement RS resource and the downlink measurement RS, for example) and the one or more SRS resources may be sent together or separately. The control information may be sent in a MAC CE message or RRC message, or a combination of both MAC CE and RRC messages. The control information may be further sent in a DCI message. The control information may convey information about the configuration of one or more downlink measurement RS resources and one or more SRS resources to inform the UE how to receive the downlink measurement RS and transmit the SRS, the configuration at least includes the frequency and time domain location of the one or more downlink measurement RS resources and one or more SRS resources. A detailed discussion of the control information and how it is received by the UE is provided below.

The UE receives the downlink measurement RS (block 409). The downlink measurement RS is received in a downlink measurement RS resource (such as a CSI-RS resource) as specified by the control information. The UE makes channel measurements based on the downlink measurement RS. The UE determines one or more candidate precoders based on the channel measurements (block 411). As an example, the UE uses a plurality of receive beams to receive the downlink measurement RS and, as a result, produces a plurality of channel measurements. The UE selects one or more precoders of one or more receive beams associated with the highest channel measurements as the candidate precoders. As an illustrative example, the receive beams with associated channel measurements that are within a specified threshold of the receive beam with a highest channel measurement are selected as the candidate precoders. As another example, the UE derives the channel information based on the downlink measurement RS and performs singular value decomposition (SVD) on the derived channel information in order to derive the eigenvector of the derived channel, and the one or more candidate precoders may be derived based on the eigenvector. The UE precodes the SRS with the candidate precoders and sends the precoded SRSs (block 413). The precoded SRSs are transmitted in the SRS resource as specified in the control information. The UE receives information about one or more selected precoders (block 415). As an example, the information about the one or more selected precoders may be received in an uplink grant, which also allocates resources for a PUSCH transmission. The UE sends the PUSCH transmission (block 417). The PUSCH transmission may be precoded using the one or more selected precoders.

According to an example embodiment, control information for a downlink measurement RS (e.g., CSI-RS) resource and a SRS resource set that includes one or more SRS resources is generated and sent to a UE, where the UE measures the downlink measurement RS to determine candidate precoders used to send the SRS on the one or more SRS resources. The SRS resource set is configured by higher layer parameter (e.g., by RRC parameter SRS-ResourceSet), for example. For the SRS resource set, the UE may be configured with K≥1 SRS resources by a higher later parameter (e.g., by RRC parameter SRS-Resource). The SRS resource set applicability is configured by higher layer parameter (e.g., by RRC parameter SRS-SetUse). In a situation when the higher layer parameter SRS-SetUse is set to 'Non-codebook', for example, each of the SRS resources configured in the SRS resource set has one SRS antenna port.

According to an example embodiment, the control information comprises multiple control information, a first control information, a second control information, and a third control information, if needed. In an embodiment, a second control information identifies one or more CSI-RS resources, wherein the one or more CSI-RS resource is associated with the SRS resource set, which means that the precoder used for SRS transmission in the SRS resources within the SRS resource set is derived in accordance with at least one of the one or more CSI-RS resources. Furthermore, if more than one CSI-RS resources are identified by the second control information, a first control information may be used to identify a SRS resource set including one or more SRS resources that a UE uses to send SRS, and a third control information may be used to identify a downlink measurement RS (e.g., CSI-RS) resource from the more than one CSI-RS resources that a UE measures to determine candidate precoders. As an example, an identifier of a SRS resource set may be information that permits the UE to determine which SRS resource set out of a plurality of SRS resource sets is being conveyed by the access node, including a SRS resource set number, an identifier of a SRS resource (which is a member of the SRS resource set, for example), an identifier of a CSI-RS resource (that has an association with the SRS resource set or a SRS resource that is a member of the SRS resource set), and so forth. A UE receives the second control information and the first control information (and the third control information if the second control information identifies more than one CSI-RS resources), and determines candidate precoders using measurements of the downlink measurement RS resource to transmit SRSs precoded using the candidate precoders in the SRS resource identified by the first control information. In an embodiment, the second control information is sent in a MAC CE message or a RRC message, and the third and the first control information is sent in a DCI message.

Figure 5:
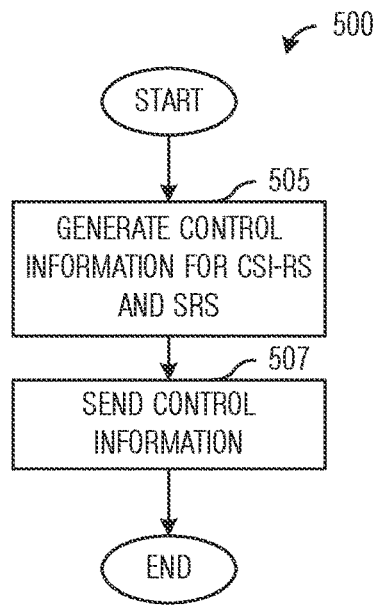
FIG. 5 illustrates a flow diagram of example operations occurring in an access node signaling control information to a UE according to example embodiments described herein.

FIG. 5 illustrates a flow diagram of example operations 500 occurring in an access node signaling control information to a UE. Operations 500 may be indicative of operations occurring in an access node as the access node generates and sends control information to a UE. The control information specifies downlink measurement RS resources for determining candidate precoders for SRS transmission.

Operations 500 begin with the access node generating the control information (block 505). The control information, which identifies a downlink measurement RS and a SRS resource set including the one or more SRS resources, may be generated separately, as multiple control information, for example. In other words, the control information may be generated as a second control information that identifies one or more CSI-RS resources and a first control information that identifies the SRS resource set including the one or more SRS resources. Furthermore, if more than one CSI-RS resources are conveyed by the second control information, a third control information may use to identify the downlink measurement RS resource from the more than one CSI-RS resources. The access node sends the control information (block 507). The control information may be sent in separate MAC CE, RRC, or DCI messages, or combined in a MAC CE, RRC, or DCI message. The control information may be sent in a combination of MAC CE, RRC, or DCI messages. For example, the configuration of the one or more CSI-RSs and the SRS resources included in the SRS resource set may be sent in the RRC message. The MAC CE message may be used to select some of the configurations conveyed by the RRC message to be activated or reconfigure some of the configuration or configure some new parameters not configured by the RRC message.

In an embodiment, the control information includes an association between the downlink measurement RS resource and the SRS resource set including the SRS resource. As an example, the second control information includes an association between the downlink measurement RS resource and the SRS resource set including the SRS resource, or information thereof. The second control information may be sent in a MAC CE message or a RRC message.

In an embodiment, in a situation when the access node sends at least one reporting setting to the UE, at least one of the reporting settings includes the identifier of the SRS resource set including the SRS resource.

In an embodiment, in a situation when the access node sends the first control information in a CSI report triggering request field that is sent in a DCI message, at least one state of the CSI report triggering request field includes the identifier of at least one reporting setting, with at least one of the reporting settings including the identifier of the SRS resource set including the SRS resource. In general, a DCI message that includes a CSI report triggering request field will trigger a recipient of the DCI message (such as a UE) to send a CSI report when the CSI report triggering request field is set to a value. The value may be specified in a technical standard, or by an operator of the communications system. The value may also be collaboratively agreed to by devices of the communications system. As an example, an identifier of a reporting setting may be information that permits the UE to determine which reporting setting out of the at least one reporting setting is being conveyed, including an index to the plurality of reporting settings, an reporting setting field code, and so forth.

In an embodiment, in a situation when the third control information is also included in the CSI report triggering request field, at least one state of the CSI report triggering request field includes the identifier of at least one reporting setting and the identifier of the CSI-RS resource, with the reporting setting being associated with the CSI-RS resource.

According to an example embodiment, a SRS resource set is configured as a reporting setting. The UE may be configured with one or more SRS resource sets (e.g., configurable by a higher layer parameter, such as parameter SRS-ResourceSetConfig). For each SRS resource set, the UE may be configured with one or more SRS resources, with the one or more SRS resources being associated with a SRS resource configuration that is configured by RRC signaling, such as SRS-ResourceConfig. Examples of SRS parameters may include number of SRS ports, time domain behavior of SRS resource configuration, orthogonal frequency division multiplexing (OFDM) symbol location of the SRS resource within a slot, frequency hopping bandwidth, frequency domain position, cyclic shift, and so on. The SRS resource is used for the access node to derive uplink channel information.

In order to derive the communication parameters (which are reported by the UE), such as channel quality indicator (CQI), precoding matrix indicator (PMI), CSI-RS resource index (CRI), rank indicator (RI), and so forth, the UE may be signaled one or more reporting settings (e.g., higher layer parameter ReportConfig) by RRC message. Each reporting setting ReportConfig includes a CSI report configuration, which includes one or more parameters for reporting channel measurement information, e.g., CSI Type (type I or type II), codebook configuration including codebook subset restriction, time domain behavior of the reporting, frequency granularity for CQI and PMI, measurement restriction configurations, reported Layer 1 RSRP parameter(s), CRI, synchronization signal block (SSB) resource indicator (SSBRI), and so on. Each ReportConfig includes an identifier (e.g., ReportConfigID) to identify the ReportConfig. If the reporting configured by the reporting setting is aperiodic, a network resource (such as slot, OFDM symbol, or subframe), or an identifier thereof, used for the aperiodic reporting may be identified by a DCI message, such as a CSI request field, the CSI request field may be included in the DCI message for downlink grant or in the DCI message for uplink grant. The network resource may be identified with information, such as, a time slot number, a frequency band or tone number, a resource element number, a component carrier number, and so forth The CSI request field also conveys information about at least one of the configured reporting setting configured by RRC parameter for UE reporting. When the UE decodes the CSI request field, the UE may report the communications parameters related to the reporting setting, which is identified by the CSI request field. The network resource used for the aperiodic reporting may be derived from the network resource used for sending the CSI request field. For example, the aperiodic reporting can be transmitted in the same network resource as the CSI request field, or the aperiodic reporting can be transmitted in a network resource after X network resources after the CSI request field, where X is a specified non-zero integer value.

According to an example embodiment, a CSI report triggering request field and a CSI measurement request field are used to jointly identify the CSI-RS resource that a UE measures to determine candidate precoders. When an access node signals a state representing no CSI report in the CSI report triggering request field and signals one state in the CSI measurement request field to trigger a CSI-RS transmission, the CSI-RS is used to determine the candidate precoders. Table 1 presents example CSI report triggering request field values with descriptions thereof. As an example, when CSI report triggering request field value equal to '00' is signaled, one CSI-RS resource is also signaled. The CSI-RS resource may be used to convey a downlink measurement RS for channel measurement by a UE to determine candidate precoders.

TABLE 1

Example of CSI report triggering request field values with description.

| Value of CSI report triggering request field | Description |
| --- | --- |
| '00' | No aperiodic CSI report is triggered |
| '01' | $1^{st}$ reporting setting is triggered |
| '10' | $2^{nd}$ reporting setting is triggered |
| '11' | $3^{rd}$ reporting setting is triggered |

According to an example embodiment, if a SRS resource set is configured as a reporting setting, the CSI request field may be used to convey information about the SRS transmission on the SRS resource within the SRS resource set. If the SRS resource set is aperiodic, the network resource used for the SRS resource set may be identified by the CSI request field. The CSI request field also conveys information about at least one of the SRS resource sets configured by RRC parameter. When the UE decodes the CSI request field, the UE may transmit the SRS resource set which is identified by the CSI request field. The network resource used for the SRS resource set may be derived in accordance with the network resource used for sending the CSI request field. For example, the SRS can be transmitted in the same network resource as the CSI request field, or the SRS can be transmitted in a network resource after X network resources after the CSI request field, where X is a specified non-zero integer value.

In order to derive the communication parameters for reporting to the access node, UE may derive the channel information based on measuring the CSI-RS receiving in the CSI-RS resource identified by RRC message. The CSI-RS resource configuration includes a plurality of parameters, including port number, frequency-time location, code division multiplexing (CDM), resource type, and so on. If the CSI-RS resource configured by the RRC message is aperiodic, a network resource used for the aperiodic CSI-RS transmission may be identified by a DCI message, such as a CSI request field. The network resource used for the aperiodic CSI-RS resource may be derived in accordance with the network resource used for sending the CSI request field. For example, the CSI-RS transmitted in the aperiodic CSI-RS resource can be received in the same network resource as the CSI request field, or the aperiodic CSI-RS resource can be transmitted in a network resource after X network resources after the CSI request field. The CSI request field also identifies at least one of the more than one CSI-RS resources configured by RRC parameter. When the UE decodes the CSI request field, the UE may receive the CSI-RS in the CSI-RS resource identified by the CSI-RS request field. The UE may use the identified CSI-RS resource to report the communications parameters related to the reporting setting which is associated with the CSI-RS resource. The association between the CSI-RS resource and the reporting setting is conveyed by RRC message. In this case, the triggering of the CSI-RS resource and the associated reporting setting can be jointly initiated by the CSI request field.

Therefore, the CSI request field is usable for triggering both the transmission of the CSI-RS resource(s) and the SRS resource(s), wherein the CSI-RS resource(s) is associated with the SRS resource(s), which means that the precoder used for transmitting the SRS in the SRS resource is derived based on measurements of the CSI-RS resource.

The association of the reporting setting with the CSI-RS resource may be signaled by RRC message. If the SRS resource set is configured as a reporting setting, then the association between the CSI-RS resource and the SRS resource set may also be signaled by the RRC message. At least one state of the CSI request field may include both of the identifier of the CSI-RS resource and the identifier of the reporting setting, and the reporting setting may include the configuration of the SRS resource set. When the CSI request field is set to the at least one state of the CSI request field, both of the CSI-RS resource and the SRS resource set are signaled. Furthermore, the CSI-RS resource is triggered, and the UE may receive the CSI-RS in the configured slot, such as the same slot as the slot including CSI request field or N slots after the slot including CSI request field, wherein the N is a specified non-zero positive integer value. The SRS resource set is also triggered, and the UE may transmit the SRS after precoding with precoders based on measuring the CSI-RS in the configured slot, such as the same slot as the slot including the CSI request field or M slots after the slot including the CSI request field, wherein the M is a specified non-zero positive integer value that is larger than N. In this situation, the CSI request field may be used to convey the presence of the SRS resources in the SRS resource set and the presence of the associated CSI-RS resource; Or the CSI request field may be used to trigger the SRS transmission within the SRS resources in the SRS resource set and the CSI-RS transmission within the associated CSI-RS resource.

Figures 6, 7:
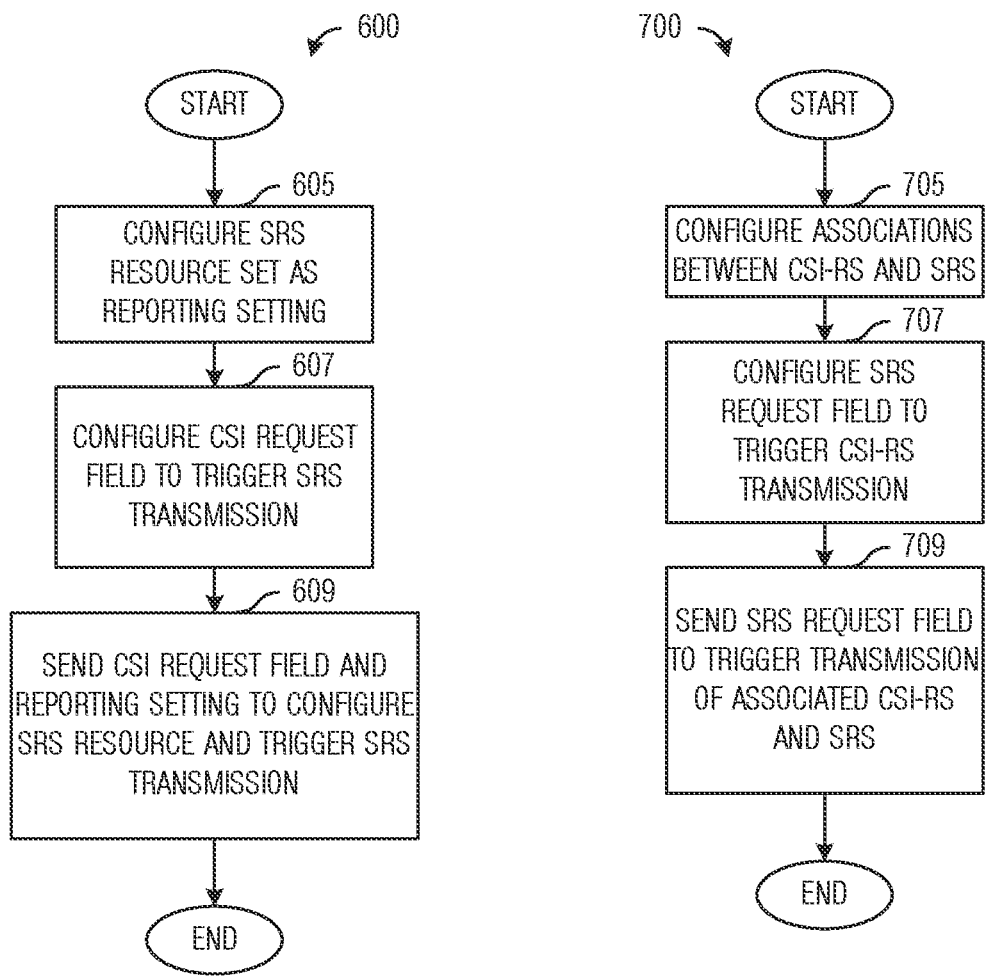
FIG. 6 illustrates a flow diagram of example operations occurring in an access node sending control information for a SRS resource by using a reporting setting according to example embodiments described herein.
FIG. 7 illustrates a flow diagram of example operations occurring in an access node sending control information to trigger a CSI-RS transmission by reusing a trigger for a SRS transmission according to example embodiments described herein.

FIG. 6 illustrates a flow diagram of example operations 600 occurring in an access node sending control information for a SRS resource set by using a reporting setting. Operations 600 may be indicative of operations occurring in an access node as the access node sends control information for a SRS resource set by using a reporting setting.

Operations 600 begin with the access node configuring the SRS resource set as a reporting setting (block 605). The access node also configures the state of the CSI request field (a jointly encoded CSI report triggering request and CSI measurement request) to trigger SRS transmission when the access node signals one state of the CSI request field (block 607). The access node sends the CSI request field (e.g., the control information) (block 609). The CSI request field and the reporting setting configure the SRS resource at the UE receiving the control information and triggers SRS transmission by the UE. It is noted that each reporting setting is linked with at least one CSI-RS resource setting. It is also noted that the reporting setting, the CSI-RS resource setting, and the link between the two are signaled by RRC messaging. If the SRS resource setting (which includes at least one SRS resource identifier or its configuration parameters) is configured as a CSI reporting setting, the CSI-RS resource setting may be associated with the SRS resource setting in the CSI framework. In such a situation, when a CSI request is triggered, the SRS resource and the CSI-RS resource are also triggered.

In an embodiment, when the first control information is included in a SRS request field, at least one state of the SRS request field includes an identifier of at least one SRS resource set that includes at least one SRS resource configured by RRC message used by the UE to transmit the SRS.

If the SRS resource set is aperiodic in nature, the network resource used for the SRS resource set may be signaled by a SRS request field, and the SRS request field may be included in the DCI message for downlink grant or in the DCI message for uplink grant. When the UE decodes the SRS request field, the UE may transmit the SRS resource with the SRS resource set signaled by the SRS request field. The network resource used for the SRS resource may be derived in accordance with the network resource used for sending the SRS request field. For example, the SRS can be transmitted in the same network resource as the SRS request field, or the SRS can be transmitted in a network resource X network resources after the SRS request field, where X is a specified non-zero integer value. In an embodiment, when the second control information includes the identifier of the SRS resource set and the identifier of the CSI-RS resource, and the UE may derive the information that the SRS resource set is associated with the CSI-RS resource based on the second control information. In an embodiment, when the SRS resource set is associated with more than one CSI-RS resources, the third control information is used for selecting one CSI-RS from the more than one CSI-RS resources associated with the SRS resource set. The third control information may be also included in the SRS request field. If the CSI-RS resource configured by the RRC message is aperiodic, a network resource used for the aperiodic CSI-RS transmission may be signaled by the SRS request field. The network resource used for the aperiodic CSI-RS resource may be derived in accordance with the network resource used for sending the SRS request field. For example, the CSI-RS transmitted in the aperiodic CSI-RS resource can be received in the same network resource as the SRS request field, or the aperiodic CSI-RS resource can be transmitted in a network resource X network resources after the SRS request field, where X is a specified non-zero integer value. The SRS request field also signals at least one of the more than one CSI-RS resources configured by RRC parameter. When the UE decodes the SRS request field, the UE may receive the CSI-RS in the CSI-RS resource signaled by the SRS request field. The UE may use the signaled CSI-RS resource to derive candidate precoders used for the SRS transmission which is associated with the CSI-RS resource. In this case, the triggering of the CSI-RS transmission and the associated SRS transmission can be jointly initiated by the SRS request field. In this situation, the SRS request field may be used to convey the presence of the SRS resources within the SRS resource set and the associated CSI-RS resource; Or the SRS request field may be used to trigger the SRS transmission in the SRS resources within the SRS resource set and the CSI-RS transmission in the CSI-RS resource.

At least one state of the SRS request field may include both of the identifier of the CSI-RS resource and the identifier of the SRS resource set. When the SRS request field set to the at least one state of the SRS request field, both of the CSI-RS resource and the SRS resource set are signaled. Furthermore, the CSI-RS resource is triggered, and the UE may receive the CSI-RS in the configured slot, such as the same slot as the slot including SRS request field or N slots after the slot including SRS request field, wherein N is a specified non-zero positive integer value. The SRS resource set is also triggered, and the UE may transmit the SRS after precoding with precoders based on measuring the CSI-RS in the configured slot, such as the same slot as the slot included SRS request field or M slots after the slot including the SRS request field, wherein M is a specified non-zero positive integer value larger than N.

According to an example embodiment, a SRS request field is also used to trigger the CSI-RS transmission. There may be a relationship between the CSI-RS resource and the SRS resource set. Furthermore, the association between the SRS and the CSI-RS may be configured using RRC signaling or a MAC CE message, such as a message including the second control information. The SRS request field is used to trigger the transmission of the SRS resource, with at least one state of the SRS request field including at least one SRS resource set identifier. When the particular state is signaled, the SRS resource set related to the particular state is triggered, i.e., transmitted. If more than one CSI-RS resources are configured to be associated with the SRS resource set, a message including third control information including in the SRS request field is used to select one of the more than one CSI-RS resources. The at least one state of the SRS request field also includes the identifier of the selected one CSI-RS resource. When the particular state is signaled, the SRS resource set and the associated CSI-RS resource related to the particular state is triggered, i.e., the SRS is transmitted by the UE and the CSI-RS is transmitted by the access node.

Each state of the SRS request field may include one or more SRS resource set identifiers, with the SRS resources in the one or more SRS resource sets of each state being linked to an identifier of a CSI-RS resource, which is configured by a message including the second control information. When an access node sends a SRS request, the associated CSI-RS may also be transmitted by the access node in the same slot with the SRS request field. After the CSI-RS transmission, the SRS may be transmitted. Table 2 presents example SRS request field values with descriptions thereof. Each state of the SRS request field is configured using RRC signaling. The RRC signaling and a message including the second control information may occur separately or together.

TABLE 2

Example SRS request field values with description.

| Value of SRS request field | Description |
| --- | --- |
| '00' | No SRS resource set is triggered |
| '01' | $1^{st}$ SRS resource set, $2^{nd}$ SRS resource set is triggered |
| '10' | $2^{nd}$ SRS resource set, $3^{rd}$ SRS resource set is triggered |
| '11' | $1^{st}$ SRS resource set, $3^{rd}$ SRS resource set is triggered |

If more than one CSI-RS resources are associated with the SRS resource set which is configured by a message including the second control information, the third control information and the first control information may be jointly encoded within the SRS request field. Each state of the SRS request field may be configured using RRC or MAC CE signaling to include one or more SRS resource identifiers as well as the associated CSI-RS resource identifier. When an access node sends a SRS request, the associated CSI-RS may be transmitted in the same slot. After the CSI-RS transmission, the SRS may be transmitted in accordance with a configured SRS behavior. Table 3 presents example SRS request field values with descriptions thereof.

TABLE 3

Example of SRS request field values with description.

| Value of SRS request field | Description |
|---|---|
| '00' | No SRS resource set is triggered |
| '01' | {1$^{st}$ SRS resource set, associated 1$^{st}$ CSI-RS} is triggered |
| '10' | {1$^{st}$ SRS resource set, associated 2$^{nd}$ CSI-RS} is triggered |
| '11' | {1$^{st}$ SRS resource set, associated 1$^{st}$ CSI-RS} and 2$^{nd}$ SRS resource set are triggered |

TABLE 4

Example of CSI request field values with description.

| Value of CSI request field | Description |
|---|---|
| '00' | {No reporting setting, 1$^{st}$ CSI-RS} is triggered |
| '01' | {No reporting setting, 2$^{st}$ CSI-RS} is triggered |
| '10' | {1$^{st}$ reporting setting, 1$^{st}$ CSI-RS} is triggered |
| '11' | {2$^{st}$ reporting setting, 2$^{st}$ CSI-RS} is triggered |

FIG. 7 illustrates a flow diagram of example operations 700 occurring in an access node sending control information to trigger a CSI-RS transmission by reusing a trigger for a SRS transmission. Operations 700 may be indicative of operations occurring in an access node as the access node sends control information to trigger a CSI-RS transmission by reusing a trigger for a SRS transmission.

Operations 700 begin with the access node configuring an association between a CSI-RS resource and a SRS resource (block 705). The access node also configures a SRS request field to trigger a CSI-RS transmission (block 707). The SRS request field is typically used to trigger SRS transmission. The configuring of the SRS request field to also trigger a CSI-RS transmission results in the joint encoding of the field used for SRS transmission triggering and the field used for CSI-RS transmission triggering. The access node sends the SRS request field to trigger the transmission of the SRS and the associated CSI-RS (block 709).

In an embodiment, an association between the reporting setting which includes the configurations related to CSI reporting and the at least one CSI-RS resource is configured using a RRC signaling, and UE may derive the content of CSI reporting based on measuring at least one of the at least one CSI-RS resource which is associated with the CSI reporting setting. And an association between the at least one CSI-RS resource and the SRS resource set is configured using the second control information, and UE may derive the precoder of SRS transmitted in the SRS resources based on measuring at least one of the at least one CSI-RS resource which is associated with the SRS resources. The content of the reporting setting may be set to no report, which results in no report being triggered. For example, for a CSI-RS resource, if the CSI-RS resource is associated with the SRS resources, the CSI-RS resource may not be associated with any reporting setting or the CSI-RS resource may be associated with the reporting setting and the content of the reporting setting is set to no report. When more than one CSI-RS resources are associated with the SRS resource set, one of the more than one CSI-RS resources is used by the UE to derive candidate precoders for SRS transmission, and the one CSI-RS is associated with the reporting setting which is configured with no report in its content.

Table 4 presents example CSI request field values with descriptions thereof. The SRS resource set is associated with the 1$^{st}$ CSI-RS resource and the 2$^{nd}$ CSI-RS resource by the third message. When the value of the CSI request field is '00', the 1$^{st}$ CSI-RS resource is used for deriving the candidate precoders for SRS transmission, when the value of the CSI request field is '01', the 2$^{nd}$ CSI-RS resource is used for deriving the candidate precoders for SRS transmission, for example. The SRS resource set may be also triggered by the CSI request field or by the SRS request field. The SRS resource set is associated with the 1$^{st}$ CSI-RS resource and the 2$^{nd}$ CSI-RS resource by the second control information.

According to an example embodiment, if more than one SRS resource sets are configured by the access node via a RRC message, the UE will calculate precoders for SRS transmission based on the associated CSI-RS measurement and send the SRS in at least one of the more than one SRS resource sets if the at least one of the more than one SRS resource sets are set to 'non-codebook'.

According to an example embodiment, when the CSI-RS resource is associated with a SRS resource set that includes more than one SRS resources, with each of the more than one SRS resources including only one antenna port, the UE may derive the precoder used for SRS transmission based on the associated CSI-RS. Or when the CSI-RS resource which is associated with the SRS resource set may be used for CSI acquisition, the UE may derive the precoder used for SRS transmission based on the associated CSI-RS. The CSI-RS resource used for CSI acquisition is associated with at least one reporting setting, and the content of the at least one reporting setting includes at least one of the parameters, including CRI, RI, PMI, and CQI.

According to an example embodiment, when the CSI-RS resource is associated with a SRS resource set that includes more than one SRS resources, with each of the more than one SRS resources including only one antenna port, the UE may derive the precoder used for SRS transmission based on the associated CSI-RS. Or when the CSI-RS resource which is associated with the SRS resource set is used for CSI acquisition, the UE may derive the precoder used for SRS transmission based on the associated CSI-RS. The CSI-RS resource used for CSI acquisition is associated with at least one CSI reporting setting, and the content of the at least one CSI reporting setting includes at least one of the parameters including CRI, RI, PMI, and CQI.

According to an example embodiment, when the CSI-RS resource is associated with the SRS resources, and there are more than one SRS ports in each of the associated SRS resources, the UE may derive a spatial domain transmission filter used for SRS transmission based on the spatial domain transmission filter used to receive the associated CSI-RS. Or, when the CSI-RS resource associated with the SRS resource set is used for beam management, the UE may derive a spatial domain transmission filter used for SRS transmission based on the spatial domain transmission filter used to receive the associated CSI-RS. The CSI-RS resource used for beam management is associated with at least one reporting setting, and the content of the at least one reporting setting includes at least one of the parameters including RSRP, and CRI.

In an embodiment, each CSI-RS resource has a CSI-RS type configuration as one of the parameters in the configuration of the said CSI-RS resource, and the CSI-RS type including at least two options, such as one CSI-RS type is for CSI acquisition and the other CSI-RS type is for beam management. The UE may assume that when it receives the second control information, the CSI-RS type of the CSI-RS resource configuration conveyed by the second control message may be set to for CSI acquisition.

Figure 8:
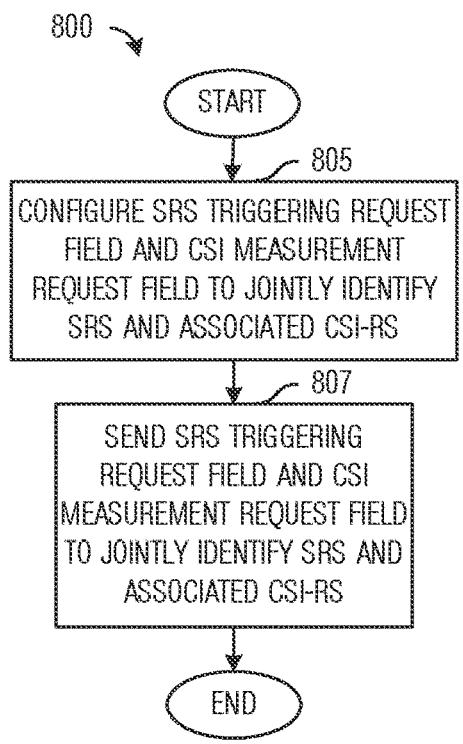
FIG. 8 illustrates a flow diagram of example operations occurring in an access node sending control information that includes jointly encoded SRS request field and CSI-RS measurement request field according to example embodiments described herein.

FIG. 8 illustrates a flow diagram of example operations 800 occurring in an access node sending control information that includes jointly encoded SRS request field and CSI-RS measurement request field. Operations 800 may be indicative of operations occurring in an access node as the access node sends control information that includes jointly encoded SRS request and CSI-RS measurement request fields.

Operations 800 begin with the access node configuring a SRS request field and a CSI-RS measurement request field to jointly identify a CSI-RS resource (block 805). The access node sends the control information (the SRS request field and the CSI-RS measurement request field) (block 807).

Figure 9:
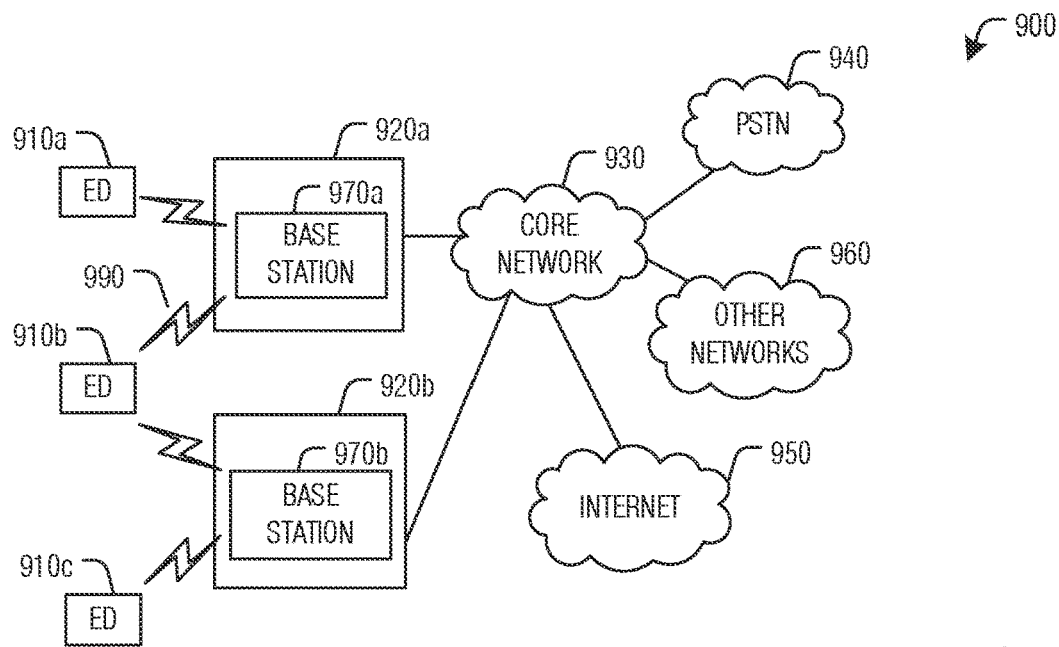
FIG. 9 illustrates an example communication system according to example embodiments described herein.

FIG. 9 illustrates an example communication system 900. In general, the system goo enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 96o. While certain numbers of these components or elements are shown in FIG. 9, any number of these components or elements may be included in the system goo.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, or the other networks 960. For example, the base stations 970a-970b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 910a-910c are configured to interface and communicate with the Internet 950 and may access the core network 930, the PSTN 940, or the other networks 960.

In the embodiment shown in FIG. 9, the base station 970a forms part of the RAN 920a, which may include other base stations, elements, or devices. Also, the base station 970b forms part of the RAN 920b, which may include other base stations, elements, or devices. Each base station 970a-970b operates to transmit or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910a-910c may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system goo could include any number of EDs, base stations, networks, or other components in any suitable configuration.

Figure 10A:
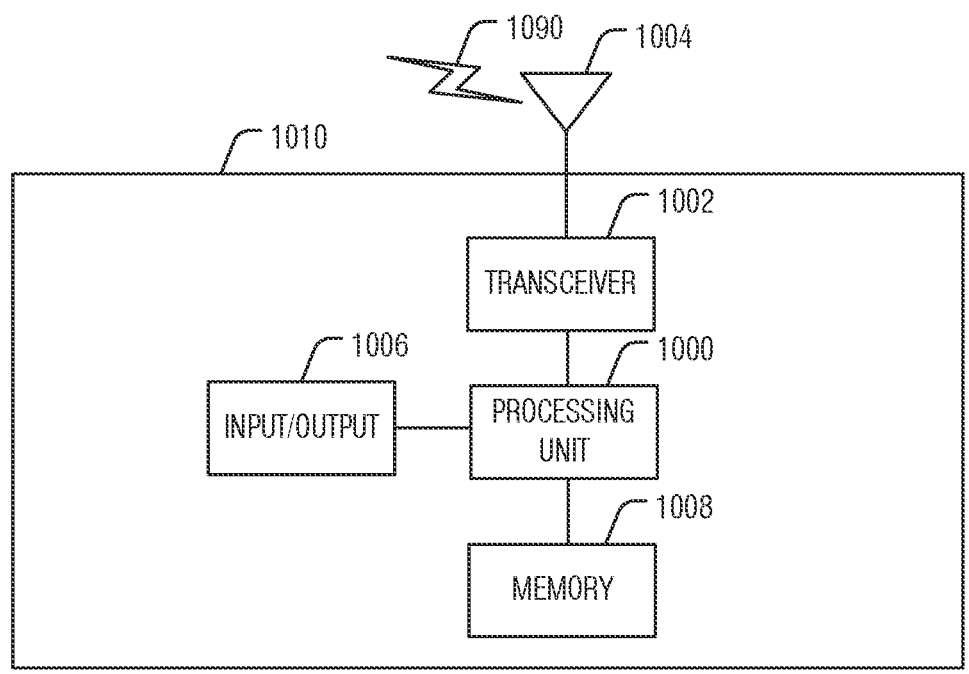
FIGS. 10A and 10B illustrate example devices that may implement the methods and teachings according to this disclosure.
Figure 10B:
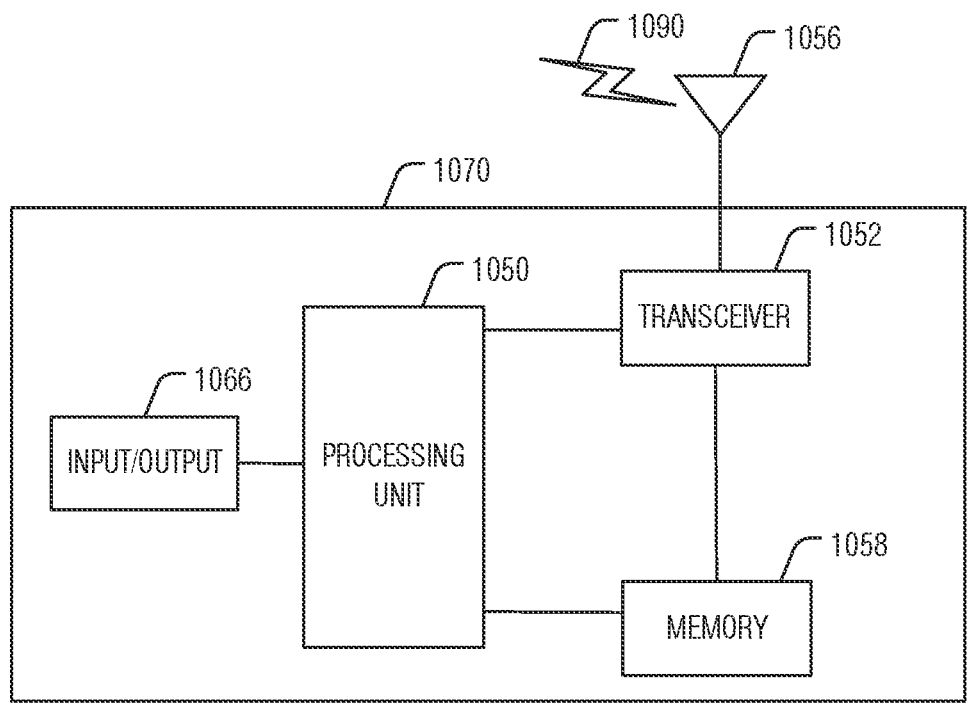

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1210, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
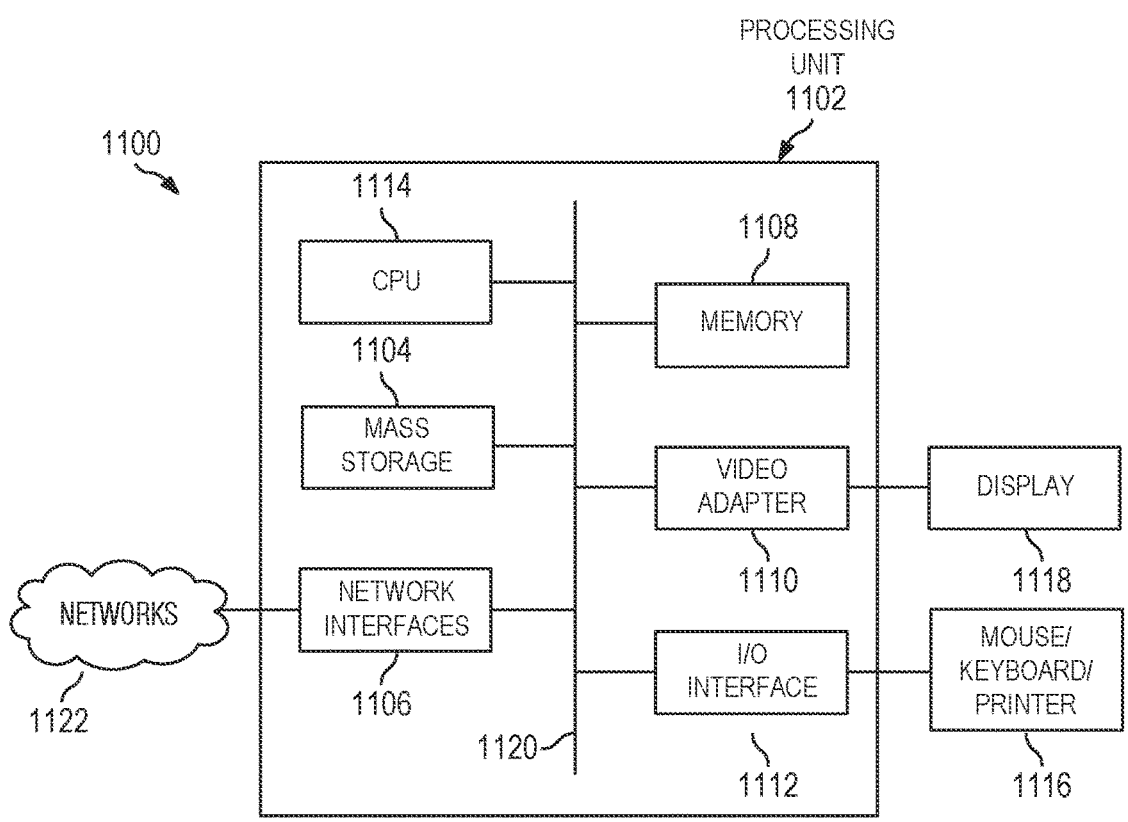
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 111o, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 118 coupled to the video adapter 1110 and a mouse, keyboard, or printer 116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit or module, a determining unit or module, a precoding unit or module, or an allocating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating an access node, the method comprising:
sending, by the access node to a user equipment (UE), a configuration of a first channel state information reference signal (CSI-RS) resource and an identifier of the first CSI-RS resource, and a configuration of a sounding reference signal (SRS) resource and an identifier of the SRS resource;
sending, by the access node, a first CSI-RS and an SRS request field in a same slot; and
receiving, by the access node, an SRS precoded by a precoder in the SRS resource, the SRS resource located after a network resource used to send the first CSI-RS in a time domain,
wherein the first CSI-RS resource is associated with the SRS resource, the first CSI-RS resource carrying the first CSI-RS to be used by the UE for making measurements to determine the precoder.

2. The method of claim 1, wherein the precoder used to precode the SRS is derived in accordance with the first CSI-RS.

3. The method of claim 1, further comprising:
sending, by the access node, a configuration of a second CSI-RS resource and an identifier of the second CSI-RS resource; and
sending, by the access node, a second CSI-RS in the second CSI-RS resource, wherein the SRS request field indicates use of the second CSI-RS resource.

4. The method of claim 3, wherein the SRS request field comprises 2 bits.

5. The method of claim 1, further comprising:
sending, by the access node to the UE, a configuration of an SRS resource set comprising the SRS resource and at least one additional SRS resource, and an identifier of the at least one additional SRS resource, wherein the first CSI-RS is to be used by the UE for making measurements to determine a plurality of precoders; and
receiving, by the access node, at least one additional SRS precoded by an additional precoder different from the precoder in the at least one additional SRS resource, the at least one additional SRS resource located after the network resource used to send the first CSI-RS in the time domain.

6. The method of claim 5, wherein the SRS request field identifies the SRS resource set.

7. The method of claim 1, wherein the SRS request field triggers a measurement of the first CSI-RS and transmission of the SRS.

8. The method of claim 1, wherein the SRS request field conveys a presence of the first CSI-RS.

9. An access node comprising:
one or more processors; and
at least one non-transitory computer readable storage medium storing programming for execution by the one or more processors, the programming including instructions to cause the access node to:
send, to a user equipment (UE), a configuration of a first channel state information reference signal (CSI-RS) resource and an identifier of the first CSI-RS resource, and a configuration of a sounding reference signal (SRS) resource and an identifier of the SRS resource;
send a first CSI-RS and an SRS request field in a same slot; and
receive an SRS precoded by a precoder in the SRS resource, the SRS resource located after a network resource used to send the first CSI-RS in a time domain,
wherein the first CSI-RS resource is associated with the SRS resource, the first CSI-RS resource carrying the first CSI-RS to be used by the UE for making measurements to determine the precoder.

10. The access node of claim 9, wherein the precoder used to precode the SRS is derived in accordance with the first CSI-RS.

11. The access node of claim 9, wherein the programming further includes instructions to cause the access node to:
send a configuration of a second CSI-RS resource and an identifier of the second CSI-RS resource; and
send a second CSI-RS in the second CSI-RS resource, wherein the SRS request field indicates use of the second CSI-RS resource.

12. The access node of claim 11, wherein the SRS request field comprises 2 bits.

13. The access node of claim 11, wherein the programming further includes instructions to cause the access node to:
send, to the UE, a configuration of an SRS resource set comprising the SRS resource and at least one additional SRS resource, and an identifier of the at least one additional SRS resource, wherein the first CSI-RS is to be used by the UE for making measurements to determine a plurality of precoders; and
receive at least one additional SRS precoded by an additional precoder different from the precoder in the at least one additional SRS resource, the at least one additional SRS resource located after the network resource used to send the first CSI-RS in the time domain.

14. The access node of claim 13, wherein the SRS request field identifies the SRS resource set.

15. The access node of claim 11, wherein the SRS request field triggers a measurement of the first CSI-RS and transmission of the SRS.

16. The access node of claim 11, wherein the SRS request field conveys a presence of the first CSI-RS.

17. A method for operating a user equipment (UE), the method comprising:
receiving, by the UE from an access node, a configuration of a first channel state information reference signal (CSI-RS) resource and an identifier of the first CSI-RS resource, and a configuration of a sounding reference signal (SRS) resource and an identifier of the SRS resource;
receiving, by the UE, a first CSI-RS and an SRS request field in a same slot, the first CSI-RS being received via the first CSI-RS resource;
determining, by the UE, a precoder for transmitting an SRS in the SRS resource in accordance with a measurement of the first CSI-RS; and
sending, by the UE in the SRS resource, the SRS precoded in accordance with the precoder, the SRS resource located after a network resource used to receive the first CSI-RS in a time domain,
wherein the first CSI-RS resource is associated with the SRS resource, the first CSI-RS resource carrying the first CSI-RS.

18. The method of claim 17, further comprising:
receiving, by the UE, a configuration of a second CSI-RS resource and an identifier of the second CSI-RS resource; and receiving, by the UE, a second CSI-RS in the second CSI-RS resource, wherein the SRS request field indicates use of the second CSI-RS resource.

19. The method of claim 18, wherein the SRS request field comprises 2 bits.

20. The method of claim 17, further comprising:
receiving a configuration of an SRS resource set comprising the SRS resource and at least one additional SRS resource, and an identifier of the at least one additional SRS resource, wherein the first CSI-RS is to be used by the UE for making measurements to determine a plurality of precoders; and
sending at least one additional SRS precoded by an additional precoder different from the precoder in the at least one additional SRS resource, the at least one additional SRS resource located after the network resource used to send the first CSI-RS in the time domain.

21. The method of claim 20, wherein the SRS request field identifies the SRS resource set.

22. The method of claim 17, wherein at least one state of the SRS request field includes the identifier of the SRS resource.

23. The method of claim 17, wherein the SRS request field triggers a measurement of the first CSI-RS and transmission of the SRS.

24. The method of claim 17, wherein the SRS request field conveys a presence of the first CSI-RS.

25. A user equipment (UE) comprising:
one or more processors; and
at least one non-transitory computer readable storage medium storing programming for execution by the one or more processors, the programming including instructions to cause the UE to:
receive, from an access node, a configuration of a first channel state information reference signal (CSI-RS) resource and an identifier of the first CSI-RS resource, and a configuration of a sounding reference signal (SRS) resource and an identifier of the SRS resource;
receive a first CSI-RS and an SRS request field in a same slot, the first CSI-RS being received via the first CSI-RS resource;
determine a precoder for transmitting an SRS in the SRS resource in accordance with a measurement of the first CSI-RS; and
send, in the SRS resource, the SRS precoded in accordance with the precoder, the SRS resource located after a network resource used to receive the first CSI-RS in a time domain,
wherein the first CSI-RS resource is associated with the SRS resource, the first CSI-RS resource carrying the first CSI-RS.

26. The UE of claim 25, wherein the one or more processors further execute the instructions to cause the UE to:
receive a configuration of a second CSI-RS resource and an identifier of the second CSI-RS resource; and
receive a second CSI-RS in the second CSI-RS resource, wherein the SRS request field indicates use of the second CSI-RS resource.

27. The UE of claim 26, wherein the SRS request field comprises 2 bits.

28. The UE of claim 25, wherein the one or more processors further execute the instructions to cause the UE to:
receive a configuration of an SRS resource set comprising the SRS resource and at least one additional SRS resource, and an identifier of the at least one additional SRS resource, wherein the first CSI-RS is to be used by the UE for making measurements to determine a plurality of precoders; and
send at least one additional SRS precoded by an additional precoder different from the precoder in the at least one additional SRS resource, the at least one additional SRS resource located after the network resource used to send the first CSI-RS in the time domain.

29. The UE of claim 28, wherein the SRS request field identifies the SRS resource set.

30. The UE of claim 25, wherein at least one state of the SRS request field includes the identifier of the SRS resource.

31. The UE of claim 25, wherein the SRS request field triggers a measurement of the first CSI-RS and transmission of the SRS.

32. The UE of claim 25, wherein the SRS request field conveys a presence of the first CSI-RS.

* * * * *